United States Patent
Rajadhyaksha et al.

(10) Patent No.: US 8,525,363 B2
(45) Date of Patent: *Sep. 3, 2013

(54) HORIZONTAL-AXIS HYDROKINETIC WATER TURBINE SYSTEM

(75) Inventors: Vikram V. Rajadhyaksha, Powell, OH (US); Roger Sam Huff, Johnstown, OH (US); Mookencheril P. Cherian, Dublin, OH (US)

(73) Assignee: DLZ Corporation, Columbus, OH (US)

( * ) Notice: Subject to any disclaimer, the term of this patent is extended or adjusted under 35 U.S.C. 154(b) by 154 days.

This patent is subject to a terminal disclaimer.

(21) Appl. No.: 13/191,537

(22) Filed: Jul. 27, 2011

(65) Prior Publication Data
US 2013/0026761 A1    Jan. 31, 2013

(51) Int. Cl.
*F03B 13/10* (2006.01)
*F03B 13/12* (2006.01)

(52) U.S. Cl.
USPC .............................. 290/53; 290/54

(58) Field of Classification Search
USPC ........................ 290/42, 43, 53, 54
See application file for complete search history.

(56) References Cited

U.S. PATENT DOCUMENTS

| | | | |
|---|---|---|---|
| 1,835,018 A | 12/1931 | Darrieus | |
| 2,392,113 A * | 1/1946 | Anderson | 416/184 |
| 3,912,937 A * | 10/1975 | Lesser | 290/43 |
| 4,276,481 A * | 6/1981 | Parker | 290/43 |
| 4,368,392 A | 1/1983 | Drees | |
| 4,383,797 A * | 5/1983 | Lee | 415/7 |
| 4,415,312 A | 11/1983 | Brenneman | |
| 4,436,484 A * | 3/1984 | Temple et al. | 416/178 |
| 5,066,867 A * | 11/1991 | Shim | 290/53 |
| 5,136,174 A * | 8/1992 | Simoni | 290/54 |
| 5,425,619 A | 6/1995 | Aylor | |
| 5,440,175 A * | 8/1995 | Mayo et al. | 290/54 |
| 5,451,137 A | 9/1995 | Gorlov | |
| 5,947,678 A | 9/1999 | Bergstein | |
| 6,006,518 A * | 12/1999 | Geary | 60/398 |
| 6,109,863 A * | 8/2000 | Milliken | 415/1 |
| 6,239,505 B1 * | 5/2001 | Kao | 290/54 |
| 6,856,036 B2 * | 2/2005 | Belinsky | 290/42 |
| 7,686,571 B1 * | 3/2010 | Matheny | 415/9 |
| 7,855,468 B2 | 12/2010 | Lin | |
| 7,963,112 B1 * | 6/2011 | Joseph | 60/499 |

(Continued)

OTHER PUBLICATIONS

Notice of Allowance and Fee(s) Due, U.S. Appl. No. 13/558,891, United States Patent and Trademark Office, May 31, 2013.

*Primary Examiner* — Tho D Ta
*Assistant Examiner* — Viet Nguyen
(74) *Attorney, Agent, or Firm* — Porter, Wright, Morris & Arthur, LLP (57) ABSTRACT

A hydrokinetic water turbine system includes a frame structure, first and second shafts rotatably supported by the frame structure, and first and second rotors secured to the first and second shafts respectively and each having a plurality of spaced-apart blades so that the flowing stream of water revolves the first and second rotors about a central axis of the first and second shafts respectively. The first and second shafts are horizontally-disposed and coaxial and the first and second rotors are adapted to rotate in opposite directions. The blades are hollow and filled with a foam material to reduce weight and increase buoyancy. The frame structure is a substantially rectangular and open frame structure and includes frame members adapted to reduce a coefficient of drag of the frame structure. The frame members can be hollow and filled with a foam material to reduce weight and increase buoyancy.

30 Claims, 9 Drawing Sheets

(56) References Cited

U.S. PATENT DOCUMENTS

| | | | |
|---|---|---|---|
| 2005/0064769 A1* | 3/2005 | Roos | 440/38 |
| 2007/0108768 A1* | 5/2007 | Dempster | 290/42 |
| 2008/0014089 A1 | 1/2008 | Janssen | |
| 2009/0091134 A1* | 4/2009 | Lyatkher | 290/54 |
| 2009/0309365 A1* | 12/2009 | Sauer et al. | 290/53 |
| 2009/0309366 A1* | 12/2009 | Moore | 290/53 |
| 2009/0315331 A1* | 12/2009 | Poupinet | 290/53 |
| 2010/0066089 A1* | 3/2010 | Best et al. | 290/52 |
| 2010/0140947 A1* | 6/2010 | McEntee et al. | 290/54 |
| 2010/0237626 A1* | 9/2010 | Hamner | 290/54 |
| 2011/0254275 A1* | 10/2011 | Joseph | 290/53 |
| 2011/0309624 A1* | 12/2011 | Ettanoor Thuppale et al. | 290/54 |
| 2012/0038163 A1* | 2/2012 | Hanna | 290/53 |
| 2012/0091717 A1* | 4/2012 | Roe et al. | 290/53 |

* cited by examiner

HORIZONTAL-AXIS HYDROKINETIC WATER TURBINE SYSTEM

CROSS-REFERENCE TO RELATED APPLICATIONS

Not Applicable

STATEMENT REGARDING FEDERALLY SPONSORED RESEARCH

Not Applicable

PARTIES TO A JOINT RESEARCH AGREEMENT

Not Applicable

REFERENCE TO APPENDIX

Not Applicable

FIELD OF THE INVENTION

The field of the present invention generally relates to apparatus that convert the movement of fluid into rotational mechanical motion for the generation of mechanical power or other useful purposes and, more particularly, to hydrokinetic water turbines that harness flowing water such as in rivers, streams, canals, industrial outflows, and the like for the generation of mechanical power or other useful purposes.

BACKGROUND OF THE INVENTION

First attempts at harnessing water as a source of energy was through waterwheels used for grinding, pumping, and driving various types of equipment. Some accounts suggest waterwheels were first used as long as 4,000 years ago. These water wheels used either the elevation change across the wheel to turn it as in the case of an overshot waterwheel or used the velocity of the water to turn the wheel as in an undershot or vertically mounted waterwheel. The undershot and vertically mounted waterwheels were based on the principle of reaction forces, with the force of the water pushing buckets or paddles along causing the wheel to turn. Generally, this was a highly inefficient means of energy extraction.

In about 1931, the French inventor Georges Darrieus developed the concept of a vertical-axis wind turbine using the principle of lift instead of reaction forces. However, the principle is essentially the same whether the turbine is used in wind or in water. In fact, the Darrieus-type wind turbines have been adapted to vertical-axis hydrokinetic turbines. The most significant difference is that the Darrieus-type vertical-axis hydrokinetic turbines utilize straight blades as opposed to an eggbeater design of the original Darrieus wind turbine. These Darrieus-type vertical-axis hydrokinetic turbines have a series of aerodynamically shaped blades that are mounted parallel to a vertical central shaft in a concentric arrangement. The individual hydrofoil-shaped blades are connected to the central shaft by support arms. The shaft transmits torque to a generator or other power transfer device. These hydrokinetic turbines can be supported by floating platforms anchored to the river bottom/sides or structures supported on the river bottom.

While these prior water turbines have been shown to be a potentially viable technology, commercially available water turbine systems have not been cost effective because they are expensive to manufacture and assemble and because they produce relatively small amounts of power due to their low efficiencies. Additionally, they are difficult to transport and install. Also, they are not particularly efficient in extracting energy and can create a significant impediment to a waterways flow. Accordingly, there is a need in the industry for an improved hydrokinetic water turbine system.

SUMMARY OF THE INVENTION

Disclosed are hydrokinetic water turbine systems that are an improvement over the existing hydrokinetic turbine systems described above. Disclosed is a hydrokinetic water turbine system configured to be placed in a flowing stream of water. The hydrokinetic water turbine system comprises, in combination, a frame structure, a shaft rotatably supported by the frame structure to rotate about a horizontally-disposed central axis of the shaft, and a rotor secured to the shaft and having a plurality of spaced-apart blades so that the flowing stream of water revolves the rotor about the central axis of the shaft. The blades are hollow and filled with a foam material to reduce weight and waterway disturbance and increase buoyancy and efficiency. When the blades are additionally extruded of aluminum and internally braced, this technique allows for reduced weight and increased buoyancy while maximizing structural strength.

Also disclosed is hydrokinetic water turbine system configured to be placed in a flowing stream of water that comprises, in combination, a substantially rectangular and open frame structure, a shaft rotatably supported by the frame structure to rotate about a horizontally-disposed central axis of the shaft, and a rotor secured to the shaft and having a plurality of spaced-apart blades so that the flowing stream of water revolves the rotor about the central axis of the shaft. The frame structure comprises frame members adapted to reduce a coefficient of drag of the frame structure. When the frame members have a profile that is the same as the blades and thus have a configuration that minimizes drag forces due to the frame, the commonality of the profile of the blades and the frame members allows for easy mass production of a significant portion of the system.

Also disclosed is a hydrokinetic water turbine system configured to be placed in a flowing stream of water that comprises, in combination, a frame structure, a first shaft rotatably supported by the frame structure to rotate about a horizontally-disposed central axis of the first shaft, a first rotor secured to the first shaft and having a plurality of spaced-apart first blades so that the flowing stream of water revolves the first rotor about the central axis of the first shaft, a second shaft rotatably supported by the frame structure to rotate about a horizontally-disposed central axis of the second shaft, and a second rotor secured to the second shaft and having a plurality of spaced-apart second blades so that the flowing stream of water revolves the second rotor about the central axis of the second shaft. The first and second shafts are coaxial and the first and second rotors are adapted to rotate in opposite directions. The counter rotating rotors results in added stability of the system and reduces forces and torque on mooring/support systems.

From the foregoing disclosure and the following more detailed description of various preferred embodiments it will be apparent to those skilled in the art that the present invention provides a significant advance in the technology and art of hydrokinetic water turbine systems. Particularly significant in this regard is the potential the invention affords for a system that is relatively easy to transport and install, relatively inexpensive to produce and assemble, and produces a relatively large amount of mechanical power for its size. Additional features and advantages of various embodiments of the invention will be better understood in view of the detailed description provided below.

BRIEF DESCRIPTION OF THE DRAWINGS

These and further features of the present invention will be apparent with reference to the following description and drawing, wherein.

Figure 4:
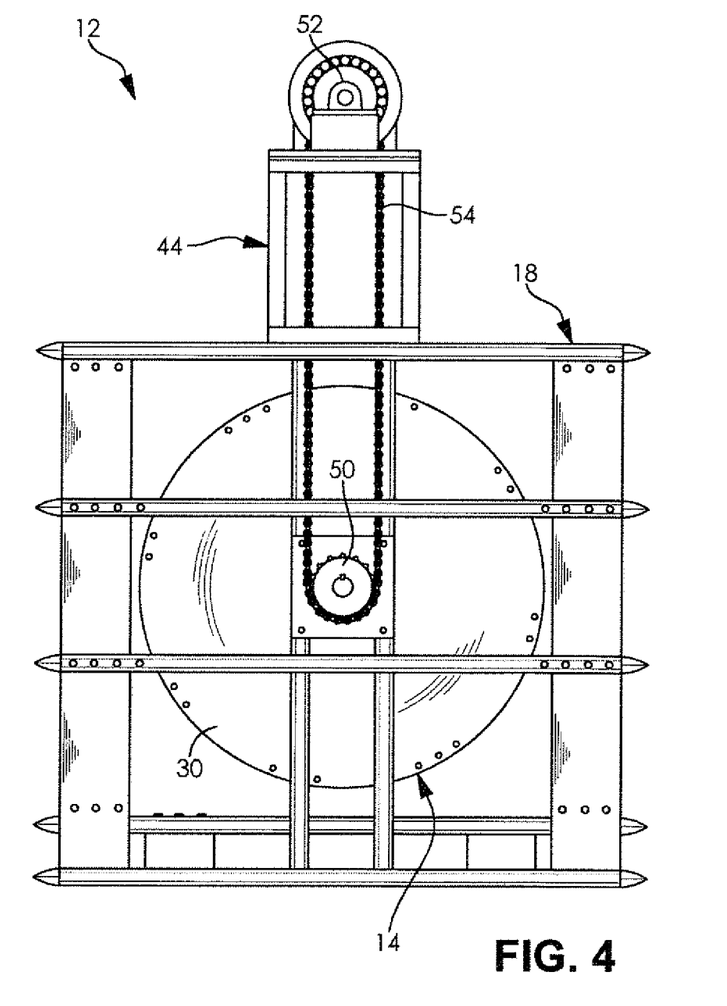
FIG. 4 is a left side elevational view of the water turbine assembly of FIGS. 2 and 3.
Figure 5:
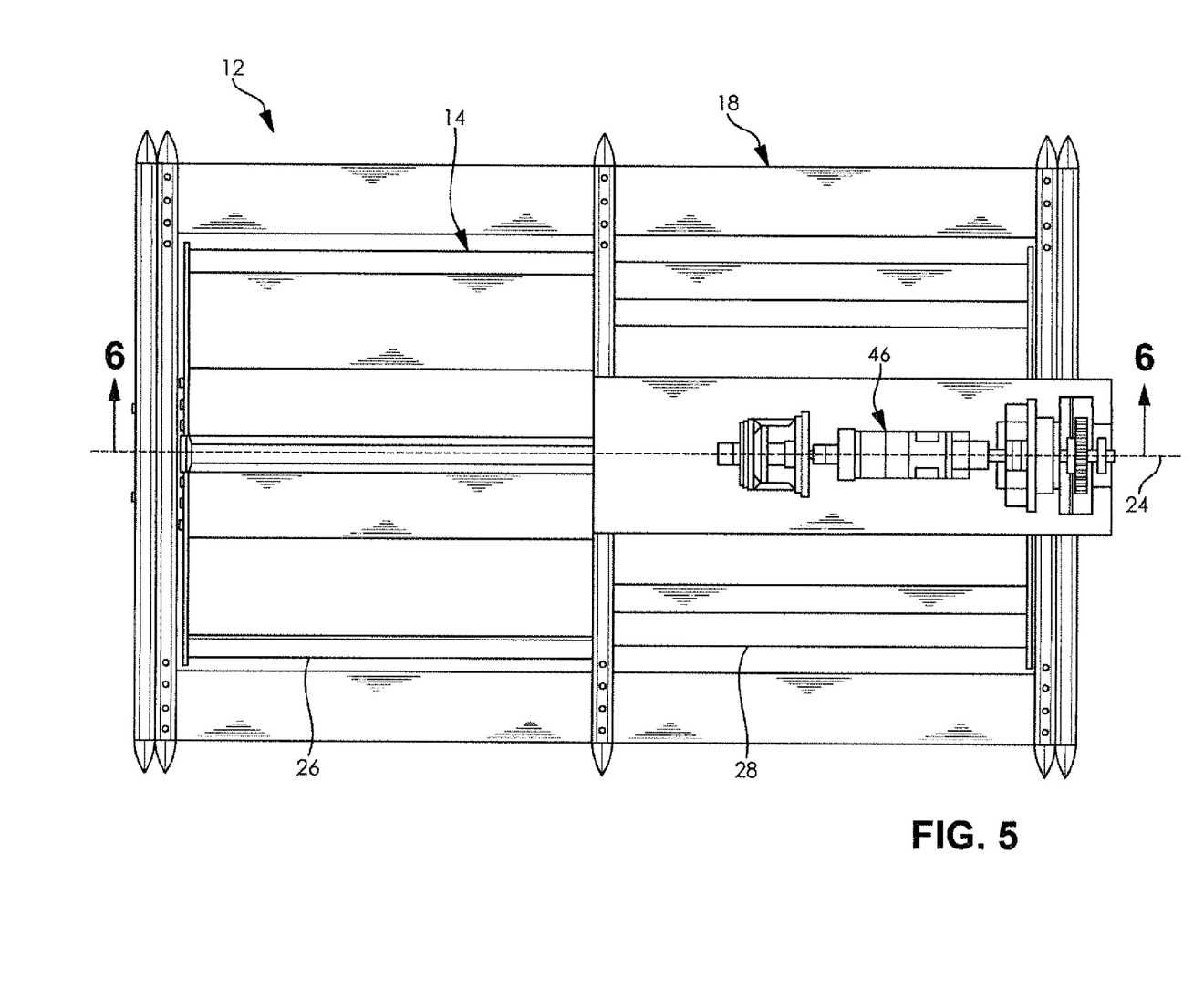
FIG. 5 is a top plan view of the water turbine assembly of FIGS. 2 to 4.
Figure 6:
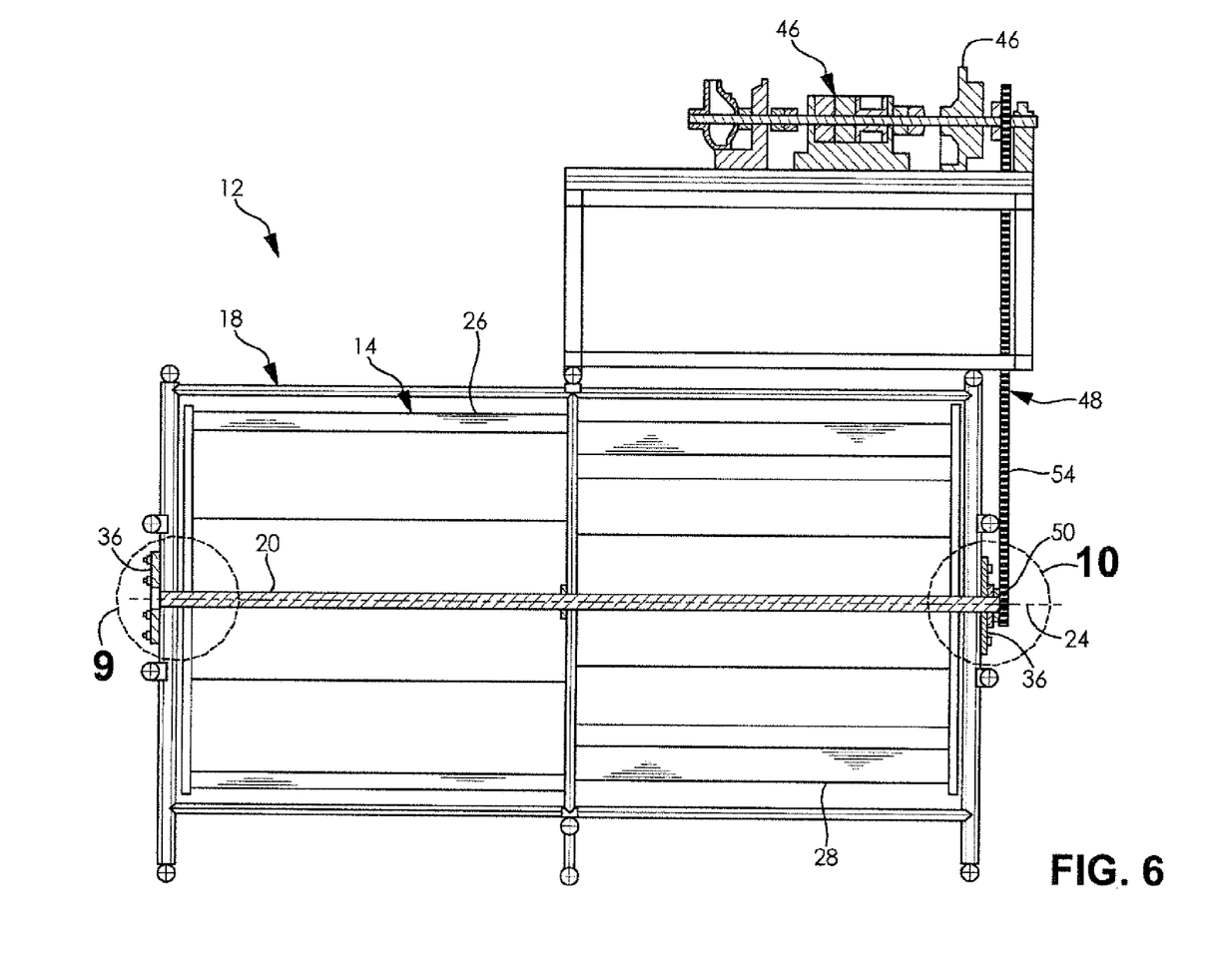
FIG. 6 is a sectional view taken along line 6-6 of FIG. 5.

It should be understood that the appended drawings are not necessarily to scale, presenting a somewhat simplified representation of various preferred features illustrative of the basic principles of the invention. The specific design features of the hydrokinetic water turbine systems as disclosed herein, including, for example, specific dimensions and shapes of the various components will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the hydrokinetic water turbine systems illustrated in the drawings. In general, up or upward refers to an upward direction within the plane of the paper in FIG. 1 and down or downward refers to a downward direction within the plane of the paper in FIG. 1. Also in general, front or forward refers to a direction facing the flow of water or upstream, that is a direction toward the left within the plane of the paper in FIG. 4 and rear or rearward refers to a direction facing away from the flow of water or downstream, that is a direction toward the right within the plane of the paper in FIG. 4.

DETAILED DESCRIPTION OF CERTAIN PREFERRED EMBODIMENTS

It will be apparent to those skilled in the art, that is, to those who have knowledge or experience in this area of technology, that many uses and design variations are possible for the improved hydrokinetic water turbine systems disclosed herein. The following detailed discussion of various alternative embodiments will illustrate the general principles of the invention. Other embodiments suitable for other applications will be apparent to those skilled in the art given the benefit of this disclosure.

Figure 1:
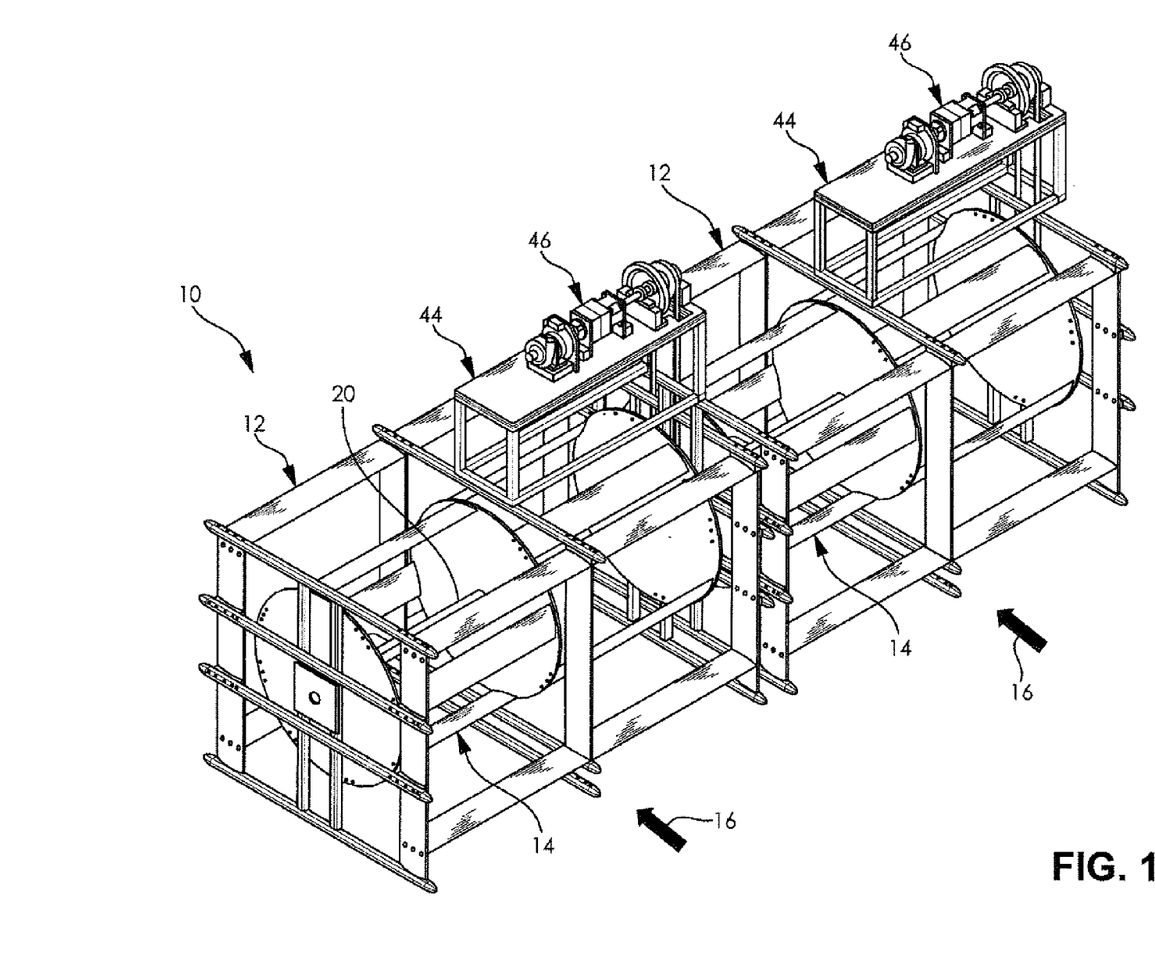
FIG. 1 is a perspective view of a horizontal-axis hydrokinetic water turbine system according to an embodiment of the present invention.
Figure 2:
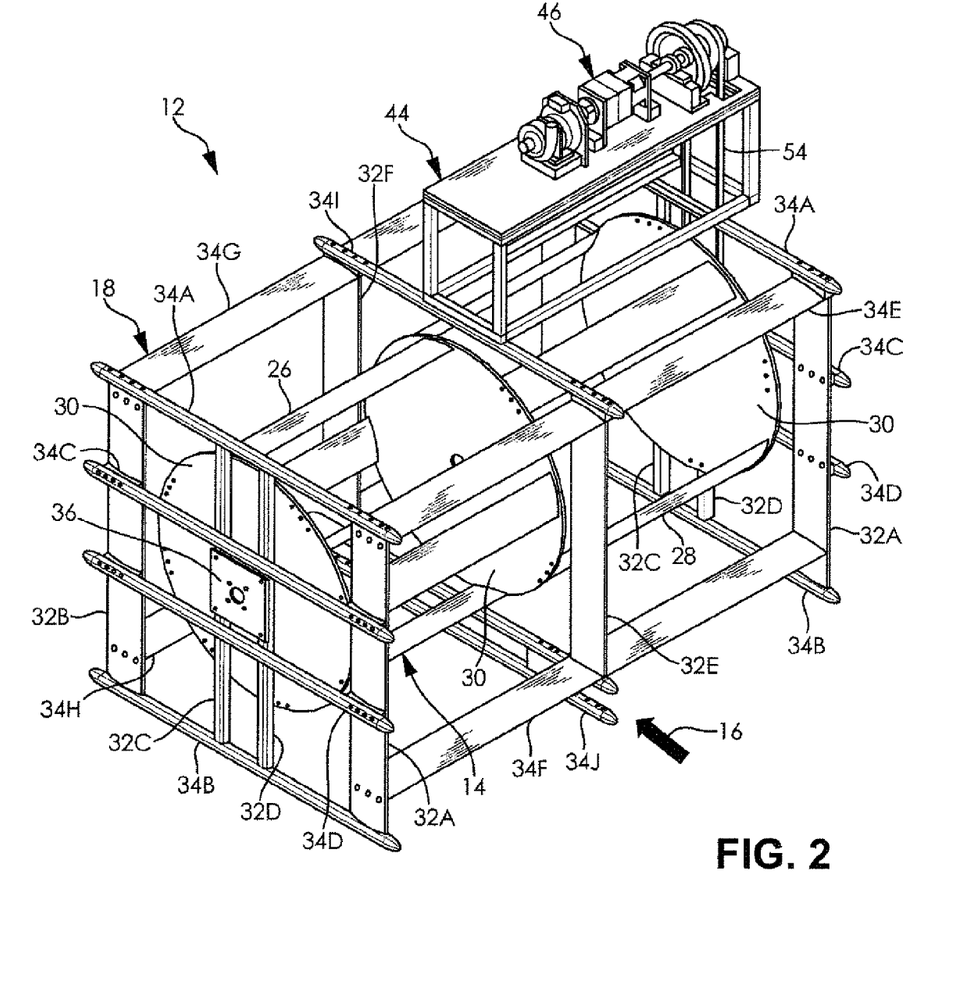
FIG. 2 is a water turbine assembly of the hydrokinetic water turbine system of FIG. 1.
Figure 3:
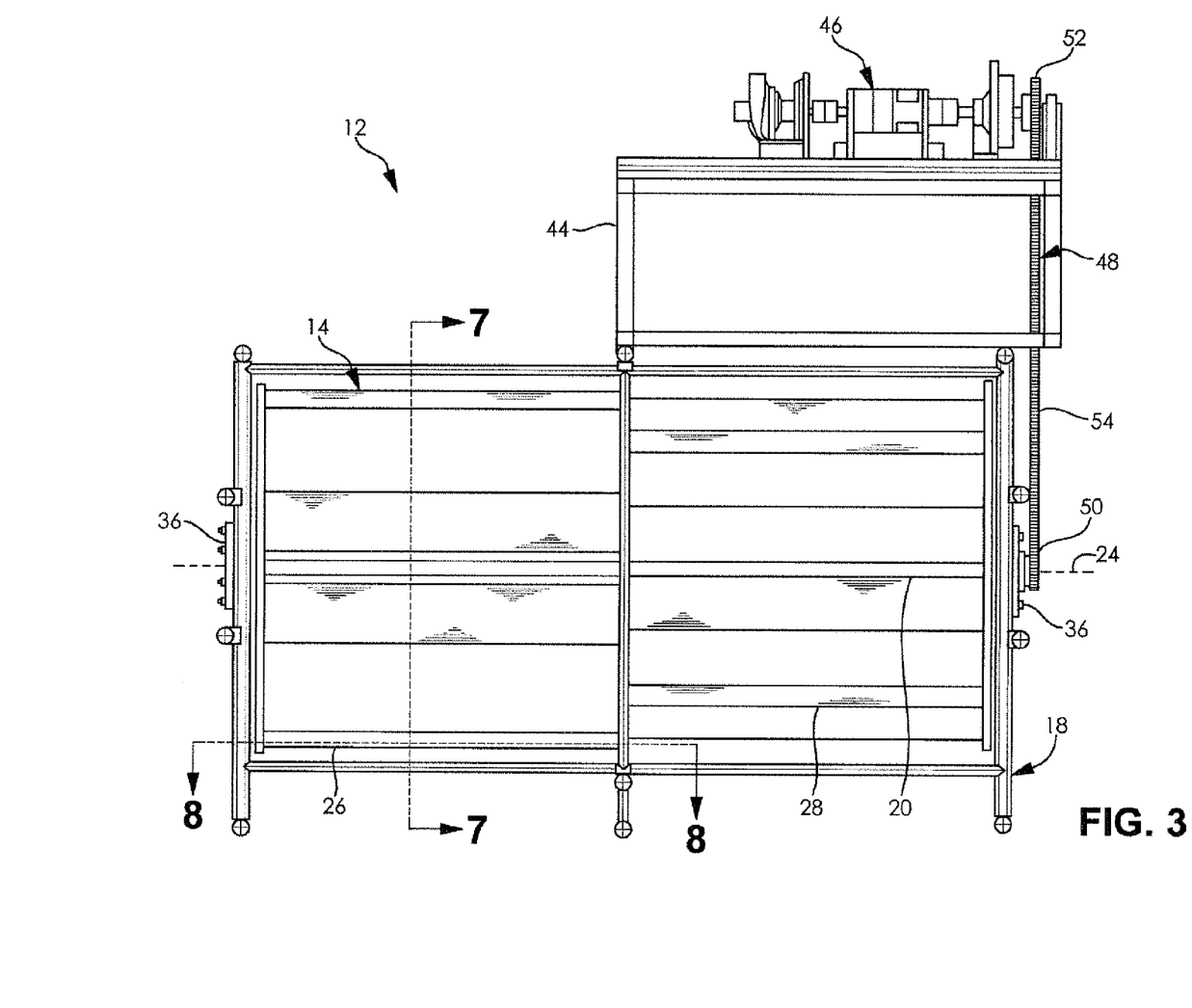
FIG. 3 is a front elevational view of the water turbine assembly of FIG. 1.

FIG. 1 illustrates a horizontal-axis hydrokinetic water turbine system 10 configured to be placed in a flowing stream of water according to one embodiment of the present invention. The illustrated hydrokinetic water turbine system 10 includes two water turbine assemblies 12 each having a horizontal axis water wheel or rotor 14 but it is noted that the hydrokinetic system 10 can alternatively have any other quantity of water turbine assemblies 12. The illustrated first and second water turbine assemblies 12 are rigidly bound or secured together side-by-side so that the first and second rotors 14 are coaxial and extend laterally across the flow or stream of water (indicated by arrow 16), that is, substantially perpendicular to the flow of water 16. The first and second water turbine assemblies 12 are substantially the same except that their rotors 14 rotate in opposite directions as described in more detail below. The counter rotating rotors 14 result in added stability of the hydrokinetic water turbine system 10 and reduces forces and torque on associated mooring/support systems.

As shown in FIGS. 2 to 10, each illustrated water turbine assembly 12 includes a frame structure 18, a rotating horizontal-axis central shaft 20 connected to the frame structure 18 through bearings 22, a rotor 14 which revolves about the central axis 24 of the shaft 20 and includes two sets of four equally-spaced blades 26, 28 connected to end or support discs that are bolted to the central shaft 20. The two sets of blades 26, 28 are staggered in configuration to improve efficiency as described in more detail below.

The illustrated frame structure 18 is a substantially rectangular and open frame structure having several vertical and horizontal frame members 32, 34 secured together to form the box-like structure 18. The illustrated frame structure 18 is sized and shaped to support the rotor 14 entirely below the surface of the water. The frame members 32, 34 are secured together in any suitable manner such as, for example, mechanical fasteners, welding, and/or the like. The illustrated frame structure 18 has a pair of laterally spaced apart end assemblies which each include front and rear vertical frame members 32A, 32B, top and bottom horizontal frame members 34A, 34B that connect the tops and bottoms of the front and rear vertical frame members 32A, 32B, and a pair of vertically spaced-apart central horizontal frame members 34C, 34D that are secured to outer sides of the front and rear vertical members 32A, 32B between the top and bottom horizontal members 34A, 34B. The illustrated end assemblies also include a pair of shaft support vertical frame members 32C, 32D extending between the top and bottom horizontal frame members 34A, 34B and located between the front and back vertical frame members 32A, 32B to support a bearing plate assembly 36 as described in more detail below. Top and bottom front horizontal frame members 34E, 34F extend between the front vertical frame members 32A of the end assemblies and top and bottom rear horizontal frame members 34G, 34H extend between the rear vertical frame members 32B of the end assemblies. Front and rear central vertical frame members 32E, 32F extend between the top and bottom front horizontal frame members 34E, 34F and the top and bottom rear horizontal frame members 34G, 34H respectively at central locations between the end assemblies. Top and bottom central horizontal frame members 34I, 34J are secured at the top and bottoms of the front and back central vertical frame members 32E, 32F. It is noted that the frame structure 18 can alternatively have any other suitable configuration.

The illustrated individual frame members 32, 34 are each designed to reduce the coefficient of drag of the frame structure 18. The illustrated frame members 32, 34 that extend in a direction perpendicular to the flow of water 16 are shaped as hydrofoils in cross section to reduce a coefficient of drag of the frame structure 18 (best shown in FIG. 12). The illustrated frame members 32, 34 that extend in a direction parallel to the flow of water 16 have substantially bullet-shaped ends to reduce the coefficient of drag of the frame structure 18 (best shown in FIGS. 13 and 14). It is noted that all or only a portion of the frame members 32, 34 can be shaped in this manner and that any other suitable shapes can alternatively be utilized but may have less or no benefit of the reduced coefficient of drag of the frame structure.

Figure 11:
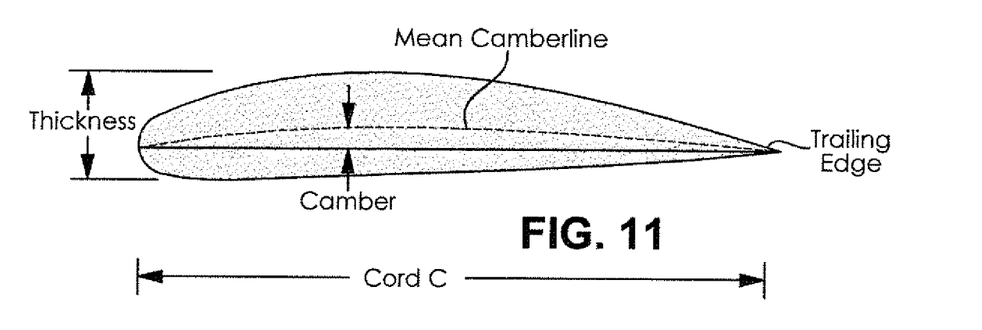
FIG. 11 is diagrammatic view of a hydrofoil illustrating geometric features.

FIG. 11 illustrates the cross section of an airfoil or hydrofoil which can be shaped to cause a desired aerodynamic effect when fluid flows there over in a direction from a leading edge to a trailing edge. A mean camber line of a hydrofoil is the locus of points halfway between the spaced-apart upper and lower surfaces as measured perpendicular to the mean camber line itself. The most forward and rearward points of the mean camber line are the leading and trailing edges, respectively. A straight line connecting the leading and trailing edges is a chord line of the hydrofoil, and a distance from the leading to the trailing edge measured along the chord line is simply designated the chord (c) of the airfoil. A thickness of the airfoil is the distance from the upper to the lower surface, measured perpendicular to the chord line, and varies with distance along the chord. The maximum thickness, and where it occurs along the chord, is an important design feature of the airfoil. Camber is the maximum distance between the mean camber line and the chord line, measured perpendicular to the chord line. Both the maximum thickness and the camber are usually expressed in terms of a percentage of the chord length; for example, a 12% thick airfoil has a maximum thickness equal to 0.12c.

Figure 12:
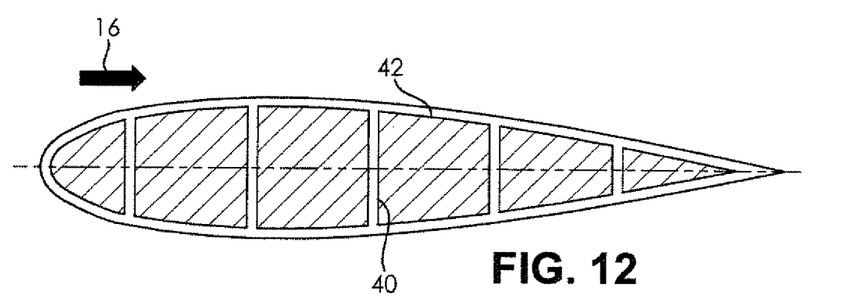
FIG. 12 is an enlarged cross-sectional view of a hollow, foam-filled hydrofoil-shaped frame member of the water turbine assembly of FIGS. 2 to 4.

The National Advisory Committee for Aeronautics (NACA) has developed standardized airfoil or hydrofoil profiles and utilizes a four digit identification system. The NACA four-digit identifications define a profile by: (1) a first digit describing maximum camber as percentage of the chord; (2) a second digit describing the distance of maximum camber from the airfoil leading edge in tens of percents of the chord; and third and fourth digits describing maximum thickness of the airfoil as percent of the chord. For example, FIG. 11 shows a NACA 2412 airfoil having a maximum camber of 2% located 40% (0.4 chords) from the leading edge with a maximum thickness of 12% of the chord. Four-digit series airfoils by default have maximum thickness at 30% of the chord (0.3 chords) from the leading edge. FIG. 12 shows a NACA 0015 airfoil which is symmetrical, the 00 indicating that it has no camber. The 15 indicates that the airfoil has a 15% thickness to chord length ratio: it is 15% as thick as it is long.

The flow of water over the hydrofoil can result in an aerodynamic force (per unit span) on the hydrofoil. The relative water stream is the magnitude and direction of the free-stream velocity far ahead of the hydrofoil. The angle between the chord line and relative water stream is defined as the angle of attack of the hydrofoil. By definition, the component of the aerodynamic force perpendicular to the relative water stream is the lift and the component of the force parallel to the relative water stream is the drag. The hydrofoil may be visualized as being supported by an axis perpendicular to the hydrofoil, and taken through any point on the hydrofoil. The hydrofoil has a tendency to twist about this axis; that is, there is an aerodynamic moment exerted on the hydrofoil. Lift is primarily a function of the shape of the hydrofoil and the angle of attack, the greater the camber and the greater the angle of attack, the greater the lift. Thus the frame members having a hydrofoil shape in cross section, can be shaped to provide a desired effect.

Figure 7A:
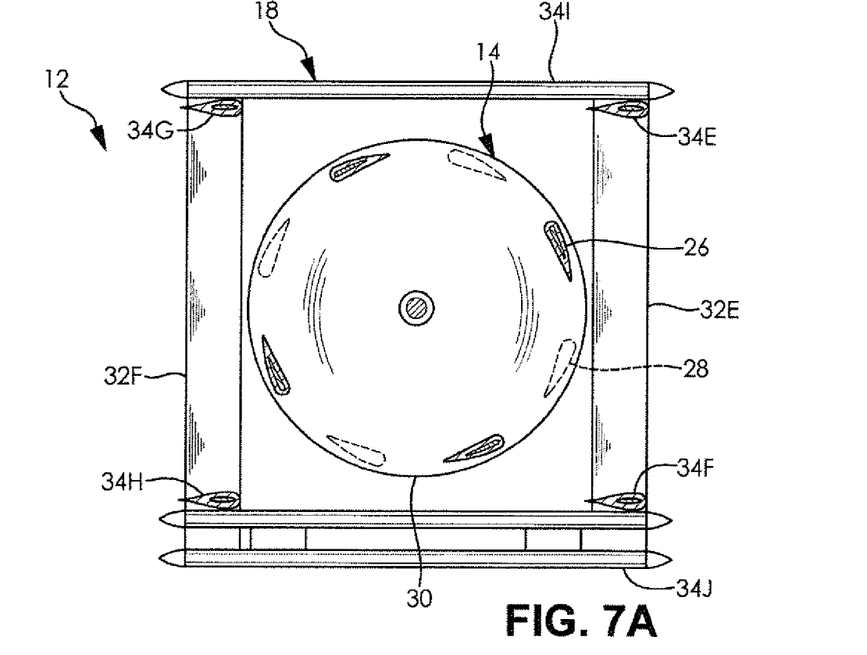
FIGS. 7A and 7B are sectional views taken along line 7-7 of FIG. 3, wherein they show rotors of the two water turbine assemblies adapted for rotation in opposite directions.
Figure 7B:
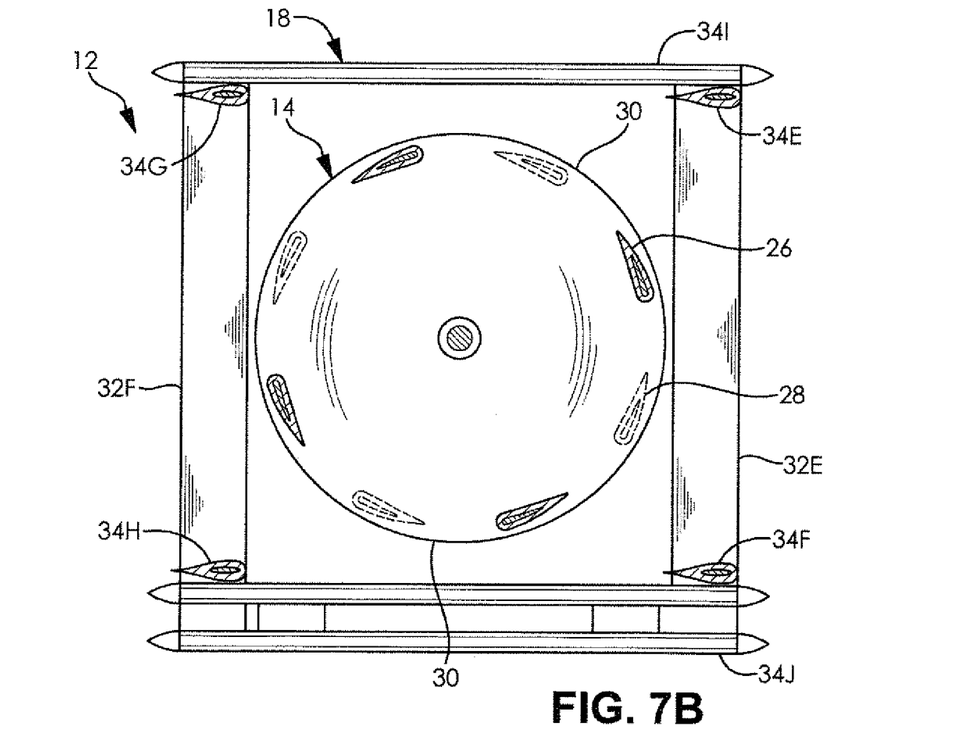
Figure 8:
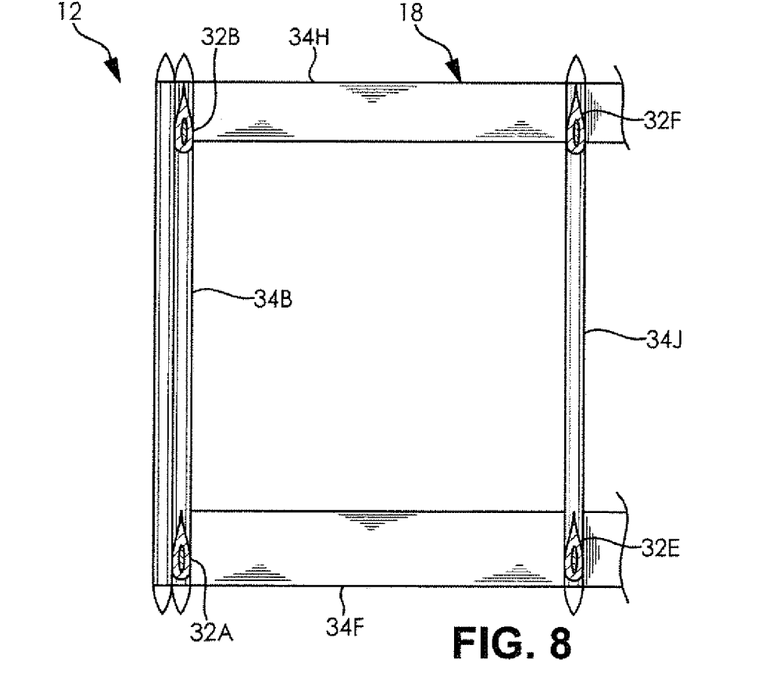
FIG. 8 is a sectional view taken along line 8-8 of FIG. 3.
Figure 9:
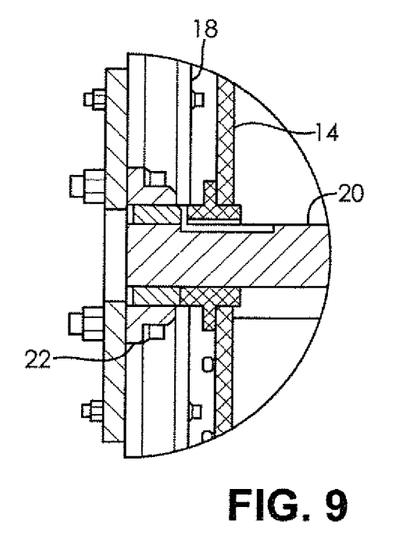
FIG. 9 is enlarged fragmented view taken from line 9 of FIG. 6.
Figure 10:
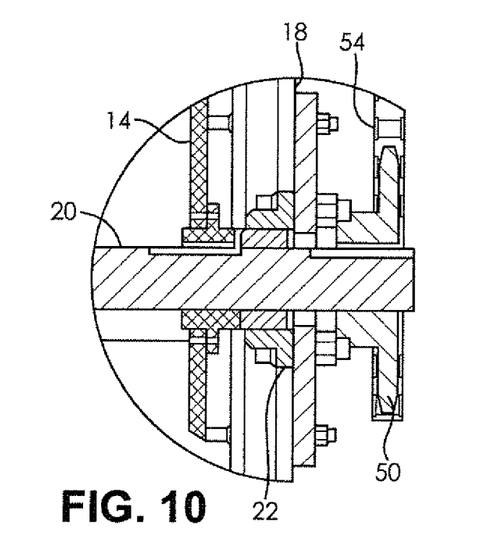
FIG. 10 is enlarged fragmented view taken from line 10 of FIG. 6.

As shown in FIGS. 7A, 7B, and 8, the illustrated frame members 32, 34 that extend perpendicular to the flow of water have a hydrofoil shape of NACA 0015 to reduce a coefficient of drag of the frame structure 18. This symmetrical hydrofoil minimizes drag without substantially creating lift when positioned in the flow stream with a zero attack angle. It is noted that the hydrofoil shape of these frame members 32, 34 can alternatively be any other suitable shape depending on the aerodynamic effect desired. When these frame members 32, 34 have a profile that is the same as the blades 26, 28 as discussed in more detail below, the commonality of the profile of the blades 26, 28 and the frame members 32, 34 allows for easy mass production of a significant portion of the hydrokinetic water turbine system 10.

Figure 13:
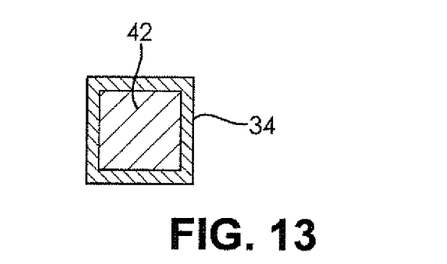
FIG. 13 is an enlarged fragmented cross-sectional view of a hollow, foam-filled circular-shaped frame member of the water turbine assembly of FIGS. 2 to 4.
Figure 14:
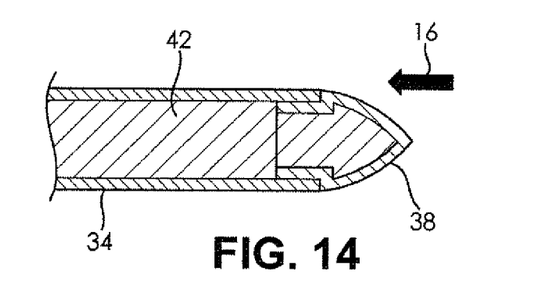
FIG. 14 is another cross-sectional view of the hollow, foam-filled circular-shaped frame member of FIG. 2 13.

As shown in FIGS. 13 and 14, the illustrated frame members 34 that extend parallel to the flow of water 16 are square in cross section and have substantially bullet-shaped ends to reduce a coefficient of drag of the frame structure 18. The illustrated frame members 34 comprise round tubes having bullet shaped end-caps 38 attached to ends thereof. The end caps 38 can be secured to the tubes in any suitable manner. The end caps 38 can be formed of any suitable material such as, for example, can be molded of a plastic. It is noted that these frame members 34 can alternatively have any other suitable shape depending on the aerodynamic effect desired and can be formed in any other desired manner such as an integral one-piece component.

Each of the illustrated frame members 32, 34 are hollow and comprise aluminum in order to reduce weight but it is noted that the frame members 23, 34 can alternatively be solid and/or comprise any other suitable material but it may result in a heavier and/or costlier structure 18. The illustrated frame members 23, 34 are hollow extrusions but it is noted that the frame members 32, 34 can alternatively be formed in any other suitable manner but it may result in a heavier and/or costlier structure 18. The illustrated hydrofoil-shaped hollow extrusions are provided with internal bracing or ribs 40 to increase strength. The illustrated hollow portions or cavities of the frame members 32, 34 are filled with a foam material 42 to increase buoyancy of the frame structure 18. The foam material 42 can be any suitable material such as, for example, a foamed plastic material and the like. It is noted that the foamed material can be eliminated if desired in some or all of the frame members 32, 34 in applications where a lesser amount of or no buoyancy is not desired.

The illustrated rotor shaft 20 is supported by the frame structure 18 so that the shaft 20 rotates about the horizontally-disposed central axis 24 of the shaft 20. The shaft 20 is oriented to extend laterally across the frame structure 18 between the bearing plate assemblies 26 so that the rotor shaft 20 is perpendicular to the flow of water 16. The illustrated rotor shaft 20 is supported by a pair graphite sleeve bearings 22 adapted for marine use. The illustrated sleeve bearings 22 are held by the bearing plate assemblies 36 that located at the lateral ends of the frame structure 18 to support the ends of the rotor shaft 20. The sleeve bearings 22 are preferably water lubricated. The illustrated shaft 20 is a solid aluminum round bar but any other suitable configuration and/or material can alternatively be utilized.

The illustrated rotor 14 has its first, second, and third support discs 30 rigidly secured to the shaft 20 and longitudinally spaced-apart along the length of the shaft 20. The support discs 30 can be rigidly secured to the shaft 20 in any suitable manner such as, for example, mechanical fasteners, welding, and the like. The first set of four spaced-apart blades 26 extends between the first and second support discs 30 and are equally and circumferentially spaced apart about the shaft 20. The second set of spaced-apart blades 28 extends between the second and third support discs 30 and are equally and circumferentially spaced apart about the shaft 20. The illustrated rotor 14 has four blades 26, 28 located in each gap between the discs 30 but any other suitable quantity of blades 26, 28 and/or discs 30 can alternatively be utilized. The first set of blades 26 and the second set of blades 28 are staggered so that each set has blades between each other when viewed facing the turbine assembly 12. The illustrated first set of blades 26 is spaced apart by 90 degrees from one another and the illustrated second set of blades 28 is spaced apart 90 degrees from one another but the second set of blades 28 are offset 45 degrees from the first set of blades 26 (best shown in FIGS. 7A and 7B). This offset between the first and second sets of blades 26, 28 allows for smooth rotation of the rotor 14 as there almost always a blade 26, 28 at the right location for rotation of the rotor 14. The illustrated blades 26, 28 are rigidly secured to the support discs 30 to prevent relative movement therebetween. The blades 26, 28 can be secured to the support discs 30 in any suitable manner such as, for example, by welding and the like. It is noted that the rotor 14 can alternatively have any other suitable configuration.

The illustrated rotor blades 26, 28 have a hydrofoil shape in cross section. As shown in FIG. 12, the illustrated blades 26, 28 have a hydrofoil shape of NACA 0015. It is noted that the hydrofoil shape of the blades 26, 28 can alternatively be any other suitable shape and/or orientation depending on the aerodynamic effect desired. It is noted that the angle of attack of the blades 26, 28 continuously changes as the blades 26, 28 rotate about the central axis 24 of the shaft 20. As best seen in FIGS. 7A and 7B, the blades 26, 28 of the first and second water turbine assemblies 12 face in opposite directions so that the rotor s 14 rotate in opposite directions.

Each of the illustrated blades 26, 28 are hollow and comprise aluminum in order to reduce weight but it is noted that the blades 26, 28 can alternatively be solid and/or comprise any other suitable material but it will result in heavier blades 26, 28. The illustrated blades 26, 28 are hollow extrusions but it is noted that the blades 26, 28 can alternatively be foamed in any other suitable manner but it may result in a heavier and/or costlier structure. The illustrated hollow extrusions are provided with internal bracing or ribs 40 to increase strength. The illustrated hollow portions or cavities of the blades 26, 28 are filled with a foam material 42 to increase buoyancy of the blades 26, 28 to ease rotation of the rotor 14. The foam material 42 can be any suitable foam material such as, for example, a foamed plastic material and the like. When the blades 26, 28 are extruded aluminum, internally braced, and foam filled, they provide reduced weight and increased buoyancy while maximizing structural strength.

The illustrated frame structure 18 also includes a support platform 44 for an electrical power generator assembly 46 to be driven by the mechanical power generated by the rotor 14. The electrical power generation assembly 46 can be of any suitable type. It is noted that the electrical power generation assembly 46 can alternatively be replaced with any other suitable output device operable by the mechanical energy generated by the rotor 14 such as, for example, a pump or the like. The illustrated support platform 44 is located at a top of the frame structure 18 so that the electrical power generation assembly 46 mounted on the support platform 46 can be positioned above the surface of the water. The illustrated support platform 46 is also contiguous with a lateral end of the support structure 18 so that a mechanical power transfer assembly 48 can vertically extend from an end of the shaft 20 to an end of the support platform 44. The illustrated mechanical power transfer assembly 48 comprises a chain and sprocket system having a first sprocket 50 rigidly secured to an end of the rotor shaft 20, a second sprocket 52 rigidly secured to a shaft of the electrical power generation assembly 46, and a chain 54 operably connecting the sprockets 50, 52 so that rotation of the rotor shaft 20 rotates the electrical power generation assembly 46 to produce electricity. It is noted that the mechanical power transfer assembly 48 can be of any other suitable type but may increase cost and complexity of the water turbine assembly 12.

In operation, the hydrokinetic water turbine assemblies 12 are rigidly bound or secured together side-by-side so that the first and second rotors 14 are coaxial and extend laterally across the flow of water 16, that is, substantially perpendicular to the flow of water 16. The frame structure 18 is positioned within the water so that the rotors 14 are fully submerged but the electrical power generation assemblies 46 are located above the water level. As the flow of water passes through the open frame structure 18 and the rotors 14, the rotors 14 are rotated in opposite directions by the flowing water. The mechanical power transfer assembly 48 connected to the rotor shaft 20 drives the electrical power generation assembly 46 to produce electricity from the mechanical power generated by the flowing water.

Any of the features or attributes of the above described embodiments and variations can be used in combination with any of the other features and attributes of the above described embodiments and variations as desired.

From the foregoing disclosure it will be apparent that the present invention provides an improved hydrokinetic water turbine system because the counter rotating rotors reduce torque on the system and thus simplified mooring and flotation devices can be used. Additionally, by utilizing a horizontal rotational axis, sleeve bearings can be utilized and simple drive train mechanisms can be used. Furthermore, by reducing the weight and increasing the buoyancy of the blades, lower flow velocity is required to rotate the rotor. Furthermore, by decreasing the drag of the frame structure within the flow stream, less forces are generated on the structure so that it can be made lighter and can lower negative impacts on the stream and thus the environment. The ability to have components of a relatively light weight reduces costs, increases efficiency, enables the system to be more easily transported and assembled, and allows the rotors to be rotated with less force so that the system produces a relatively large volume of electricity for its size and weight. It is believed that each rotor and frame assembly will weigh about 1200 pounds and produce about 15 kW so that the full illustrated hydrokinetic water turbine system 10 with two water turbine assemblies 12 will weigh about 2400 pounds and produces about 30 kW.

From the foregoing disclosure and detailed description of certain preferred embodiments, it will be apparent that various modifications, additions and other alternative embodiments are possible without departing from the true scope and spirit of the present invention. The embodiments discussed were chosen and described to provide the best illustration of the principles of the present invention and its practical application to thereby enable one of ordinary skill in the art to utilize the invention in various embodiments and with various modifications as are suited to the particular use contemplated.

All such modifications and variations are within the scope of the present invention as determined by the appended claims when interpreted in accordance with the benefit to which they are fairly, legally, and equitably entitled.

What is claimed is:

1. A hydrokinetic water turbine system configured to be placed in a flowing stream of water, said water turbine system comprising, in combination:
   a frame structure;
      a shaft supported by the frame structure to rotate about a horizontally-disposed central axis of the shaft;
      a rotor secured to the shaft and having a first plurality of spaced-apart blades extending parallel to the central axis of the shaft and circumferentially spaced-apart about the shaft and a second plurality of spaced-apart blades extending parallel to the central axis of the shaft and circumferentially spaced-apart about the shaft so that the flowing stream of water revolves the rotor about the central axis of the shaft;
      wherein the first and second plurality of blades are each rigidly secured to prevent relative movement between the blades;
      wherein the first and second plurality blades are each straight in the longitudinal direction and have a hydrofoil shape in cross section configured to generate lift and rotate the rotor about the horizontally disposed central axis as the flowing stream of water passes around the hydrofoil shape;
      wherein the second plurality of blades is spaced apart from the first plurality of blades in the longitudinal direction and offset from the first plurality of blades so that the second plurality of blades is circumferentially located between the first plurality of blades for smooth rotation of the rotor; and
      wherein the first and second plurality of blades are hollow extrusions with internal ribs between hollow cavities and the hollow cavities are filled with a material having a weight less than a weight of a material forming the extrusions.

2. The hydrokinetic water turbine system according to claim 1, wherein the rotor includes longitudinally spaced-apart support discs fixed to the shaft and the blades extend between the support discs and are rigidly secured to the support discs.

3. The hydrokinetic water turbine system according to claim 1, further comprising an electric power generator coupled to the shaft.

4. The hydrokinetic water turbine system according to claim 1, wherein the hollow cavities are filled with a foam material.

5. The hydrokinetic water turbine system according to claim 1, wherein the hollow extrusions are aluminum extrusions.

6. The hydrokinetic water turbine system according to claim 1, wherein the first plurality of blades comprises at least four blades and the second plurality of blades comprises at least four blades.

7. The hydrokinetic water turbine system according to claim 1, wherein the frame structure comprises a substantially rectangular open structure.

8. The hydrokinetic water turbine system according to claim 7, wherein the frame structure comprises a plurality of frame members and the frame members are hollow extrusions having hollow cavities and the hollow cavities are filled with a foam material.

9. The hydrokinetic water turbine system according to claim 8, wherein the frame members are hydrofoils to reduce the coefficient of drag of the frame structure.

10. The hydrokinetic water turbine system according to claim 1, further comprising an electric power generator supported by the frame structure above the flowing stream of water and coupled to the shaft with a chain and sprocket assembly.

11. A hydrokinetic water turbine system configured to be placed in a flowing stream of water, said water turbine system comprising, in combination:
   a substantially rectangular and open frame structure;
      a shaft supported by the frame structure to rotate about a horizontally-disposed central axis of the shaft;
      a rotor secured to the shaft and having a first plurality of spaced-apart blades extending parallel to the central axis of the shaft and circumferentially spaced-apart about the shaft and a second plurality of spaced-apart blades extending parallel to the central axis of the shaft and circumferentially spaced-apart about the shaft so that the flowing stream of water revolves the rotor about the central axis of the shaft;
      wherein the first and second plurality of blades are each rigidly secured to prevent relative movement between the blades;
      wherein the first and second plurality blades are each straight in the longitudinal direction and have a hydrofoil shape in cross section configured to generate lift and rotate the rotor about the horizontally disposed central axis as the flowing stream of water passes around the hydrofoil shape;
      wherein the second plurality of blades is spaced apart from the first plurality of blades in the longitudinal direction and offset from the first plurality of blades so that the second plurality of blades is circumferentially located between the first plurality of blades for smooth rotation of the rotor;
      wherein the first and second plurality of blades are hollow extrusions with internal ribs between hollow cavities and the hollow cavities are filled with a material having a weight less than a weight of a material forming the extrusions; and
      wherein the frame structure comprises frame members adapted to reduce the coefficient of drag of the frame structure.

12. The hydrokinetic water turbine system according to claim 11, wherein the frame members are hollow extrusions having hollow cavities and the hollow cavities are filled with a foam material.

13. The hydrokinetic water turbine system according to claim 11, wherein the hollow frame members comprise aluminum extrusions.

14. The hydrokinetic water turbine system according to claim 11, wherein at least a portion of the frame members are hydrofoils to reduce a coefficient of drag of the frame structure.

15. The hydrokinetic water turbine system according to claim 14, wherein the frame members which are hydrofoils extend in a direction substantially perpendicular to the flow stream of water.

16. The hydrokinetic water turbine system according to claim 11, wherein at least a portion of the frame members have substantially bullet-shaped ends to reduce a coefficient of drag of the frame structure.

17. The hydrokinetic water turbine system according to claim 16, wherein the frame members which have substantially bullet-shaped ends extend in a direction substantially parallel to the flow stream of water.

18. The hydrokinetic water turbine system according to claim 11, wherein the rotor includes longitudinally spaced-apart support discs fixed to the shaft and the blades extend between the support discs and are rigidly secured to the support discs.

19. The hydrokinetic water turbine system according to claim 11, wherein the hollow cavities of the blades are filled with a foam material.

20. The hydrokinetic water turbine system according to claim 11, further comprising an electric power generator supported by the frame structure and coupled to the shaft.

21. A hydrokinetic water turbine system configured to be placed in a flowing stream of water, said water turbine system comprising, in combination:
   a first hydrokinetic assembly comprising:
      a frame structure;
      a shaft supported by the frame structure to rotate about a horizontally-disposed central axis of the shaft;
      a rotor secured to the shaft and having a first plurality of spaced-apart blades extending parallel to the central axis of the shaft and circumferentially spaced-apart about the shaft and a second plurality of spaced-apart blades extending parallel to the central axis of the shaft and circumferentially spaced-apart about the shaft so that the flowing stream of water revolves the rotor about the central axis of the shaft;
      wherein the first and second plurality of blades are each rigidly secured to prevent relative movement between the blades;
      wherein the first and second plurality blades are each straight in the longitudinal direction and have a hydrofoil shape in cross section configured, to generate lift and rotate the rotor about the horizontally disposed central axis as the flowing stream of water passes around the hydrofoil shape;
      wherein the second plurality of blades is spaced a art from the first plurality of blades in the longitudinal direction and offset from the first plurality of blades so that the second plurality of blades is circumferentially located between the first plurality of blades for smooth rotation of the rotor; and
      wherein the first and second plurality of blades are hollow extrusions with internal ribs between hollow cavities and the hollow cavities are filled with a material having a weight less than a weight of a material forming the extrusions;
   a second hydrokinetic assembly comprising:
      a frame structure;
      a shaft supported by the frame structure to rotate about a horizontally-disposed central axis of the shaft;
      a rotor secured to the shaft and having a third plurality of spaced-apart blades extending parallel to the central axis of the shaft and circumferentially spaced-apart about the shaft and a fourth plurality of spaced-apart blades extending parallel to the central axis of the shaft and circumferentially spaced-apart about the shaft so that the flowing stream of water revolves the rotor about the central axis of the shaft;
      wherein the third and fourth plurality of blades are each rigidly secured to prevent relative movement between the blades;
      wherein the third and fourth plurality blades are each straight in the longitudinal direction and have a hydrofoil shape in cross section configured to generate lift and rotate the rotor about the horizontally disposed central axis as the flowing stream of water passes around the hydrofoil shape;
      wherein the fourth plurality of blades is spaced apart from the third plurality of blade in the longitudinal direction and offset from the third plurality of blades so that the fourth plurality of blades is circumferentially located between the third plurality of blades for smooth rotation of the rotor; and
      wherein the third and fourth plurality of blades are hollow extrusions with internal ribs between hollow cavities and the hollow cavities are filled with a material having a weight less than a weight of a material forming the extrusions;
   wherein the shafts of the first and second hydrokinetic assemblies are coaxial and the rotors of the first and second hydrokinetic assemblies are adapted to rotate in opposite directions.

22. The hydrokinetic water turbine system according to claim 21, wherein each of the rotors includes longitudinally spaced-apart support discs fixed to the respective shaft and the respective blades extend between the support discs and are rigidly secured to the support discs.

23. The hydrokinetic water turbine system according to claim 21, wherein the hollow extrusions are aluminum extrusions.

24. The hydrokinetic water turbine system according to claim 21, wherein the hollow cavities are filled with a foam material.

25. The hydrokinetic water turbine system according to claim 21, wherein each of the frame structures comprise a substantially rectangular open structure.

26. The hydrokinetic water turbine system according to claim 25, wherein each of the frame structures comprise frame members adapted to reduce the coefficient of drag of the frame structure.

27. The hydrokinetic water turbine system according to claim 26, wherein at least a portion of the frame members are hydrofoils to reduce the coefficient of drag of the frame structure.

28. The hydrokinetic water turbine system according to claim 26, wherein at least a portion of the frame members have substantially bullet-shaped ends to reduce the coefficient of drag of the frame structure.

29. The hydrokinetic water turbine system according to claim 21, wherein each of the frame structures comprise a plurality of frame members and the frame members are hollow extrusions having hollow cavities and the hollow cavities are filled with a foam material.

30. The hydrokinetic water turbine system according to claim 21, wherein the first hydrokinetic assembly further comprises an electric power generator supported by the frame structure and coupled to the shaft and wherein the second hydrokinetic assembly further comprises an electric power generator supported by the frame structure and coupled to the shaft.

* * * * *